Sept. 15, 1953     E. SCHLUETER     2,651,905
LAWN EDGE TRIMMER AND WEED PULLER
Filed March 21, 1951

Inventor
ERNEST SCHLUETER
By H. M. Kilpatrick
Attorney

Patented Sept. 15, 1953

2,651,905

UNITED STATES PATENT OFFICE 2,651,905

LAWN EDGE TRIMMER AND WEED PULLER

Ernest Schlueter, Troy, N. Y.

Application March 21, 1951, Serial No. 216,827

2 Claims. (Cl. 56—255)

This invention relates to cutters and to agricultural implements and to devices for cutting grass, and more particularly to devices for cutting grass, edging lawns, pulling weeds, and cultivating the ground, though it is noted that in some of the claims the invention is not limited to weeds, grass, plants, cultivation or cutting.

Objects of the invention are to provide an improved device of this kind for edging lawns, and cutting grass at different heights. Other objects are to provide a device adapted to edge lawns, pull weeds and also to make and cover furrows.

Other objects of the invention are to provide an improved device of this kind having contacting cutting parts which will always maintain firm cutting contact and which is adaptable for pulling and pushing.

Additional objects of the invention are to effect simplicity and efficiency in such devices and to provide an extremely simple device of this kind which is easy, convenient, durable, and reliable in operation and economical to manufacture and maintain.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a lawn edge trimming, weed pulling and cultivating device which briefly stated includes a fork having a handle for pulling and pushing and having arms on which a pair of disks are rotatably mounted at an angle to each other, said disks having peripheral flanges overlapping flat against each other at one point and having cutting edges, whereby forces tending to separate the disks at said point, urge said edge of the inner flange against the inner face of the outer flange, whereby pulling and pushing the device with said point lowermost causes said edges and faces substantially at said point to meet and cut grass or weed or other plants or material substantially perpendicularly close to the ground. When the fork is disposed to put said point of contact a few degrees to the rear of the lowest point, the grass is cut less close. A removable peripheral ring may also be provided on the outer ring to space it from the ground to cause the device to cut still less closely. When the fork is disposed to put said point of contact about 45 degrees to the rear of the lowest point, the cutting edge at said point meets grass or weeds substantially tangentially and meets so much resistance that the weed or grass is pulled up.

The handle may be rigidly connected to the fork, but if desired, the handle may be adjustably mounted on the fork for disposing the handle in the most convenient position for any of the dispositions of the fork.

The parts may be disposed to adapt the device for plowing and covering a furrow.

In the accompanying drawing showing, by way of example, two of many possible embodiments of the invention, Fig. 1 is a fragmental side elevation showing one form of the invention;

Figure 1:
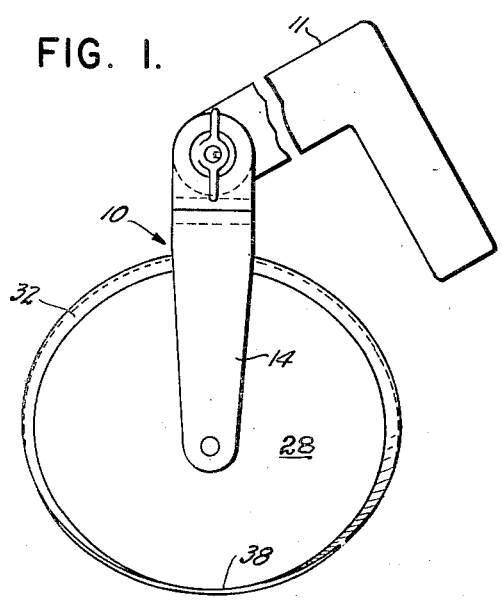

My improved device 10 for trimming the edges of lawns and pulling weeds is provided with a handle 11 to which is secured a substantially inverted U-shaped support or fork 12 having downwardly and inwardly extended arms 13, 14 and a long substantially horizontal yoke 15 connecting the upper ends of said arms.

The handle may be adjustably or non-adjustably secured to the yoke in any suitable manner, and is shown secured to an upwardly projecting lug 16 mounted on the yoke and having a bore substantially parallel to the yoke of the fork and a face surrounding the bore perpendicular to the axis of the bore about midway of the yoke and provided with a series of radial ribs 17 surrounding the bore. A bolt 18 in said bore receives a bore of the handle 11 and has at the one end a head 21 engaging the handle. The handle has a series of radial ribs 22 adapted to be engaged between said ribs 17 of the lug. A wing nut 23 on said bolt engages the lug at the side opposite to said ribs for holding said ribs in engagement, whereby the handle may be adjustably disposed at substantially any one of more than 270 degrees relative to the plane of the fork.

Inwardly slightly upwardly projected stub-shafts 25, 26 fast on the lower end of the arms 13, 14 respectively substantially in the plane of the fork rotatably carry concave-convex outer drive and inner driven disks 27, 28 on said stub shafts respectively, each disk having its concave face faced away from its associated arm and provided with a hub 29 fast thereon receiving the stub-shaft, and held thereon by lock-nut 30 on the stub-shaft.

Figure 2:
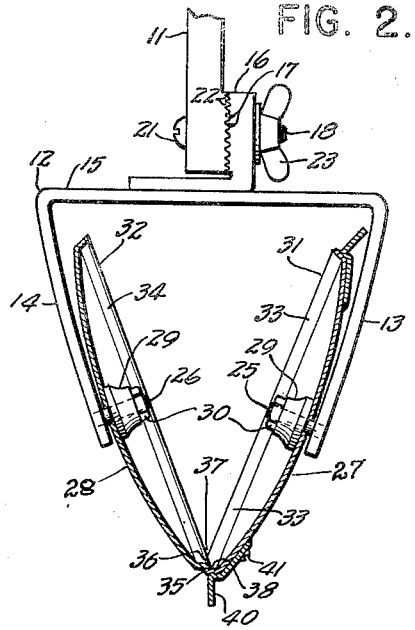
Fig. 2 is a fragmental front elevation of the device shown in Figure 1 with the disks broken away and shown in section.

The main planes of the disks 25, 26 are shown disposed at an angle of about 45 degrees to each other, and at equal angles to the vertical. The peripheries of the outer and inner disks are provided with narrow outwardly flaring annular marginal flanges 31, 32 respectively having smooth inner and outer engagement faces 33, 34 each flaring away from its disk and here shown disposed at an angle of about 114 degrees from the main plane of the disk, said faces 33, 34 at the lowest part of the disks, as in Figs. 1 to 3, at which point the disks are closest, overlapping and engaging flat against each other.

Said outer and inner faces have sharp cutting edges 35, 36, the cutting edge 36 of the inner disk near the normally lowest part of the disks crossing as at 37, the cutting edge 35 of the outer disk. At the most adjacent part of the disks, cutting edge 36 engages firmly with said engagement face 33 at a point 38 of contact remote from the outer edge thereof. Said inner face 33 of said outer flange at said point 38 of contact converges toward the axis of the inner disk 26, whereby forces tending to separate the disks at said point 38 of contact, force and hold the edge 36 of the inner disk strongly into cutting relation with the engagement face 33 of the outer disk.

When the device is moved along the lawn substantially in a path perpendicular to the plane of said fork (the ring 40 later described being removed) with said point 38 of contact at the lowest point of the disks, the friction of the lawn rotates the outer disk 27 and causes the cutting edges 35, 36 near said point to come together with scissors action and meet grass substantially perpendicular to the grass; and the edge 36 forces the grass against the edge of the outer flange and said inner face 33 to cut the grass close to the ground. If the fork be tilted to place said point 38 of contact about 15 to 25 degrees to the rear of said lowest point, travel of the device causes the cutting edge 36 at said contact point 38 to meet the grass about 15 to 25 degrees to the rear of the lowest point, and causes the grass to be cut less close to the ground.

If the fork is tilted to cause said point 38 of contact to dispose itself about 45 degrees to the rear of the lowest point of the disks, said edges at said contact point will meet grass or weeds substantially tangentially thereof causing the grass or weed to be disposed along the cutting edges and so much to resist cutting that the grass or weed is not cut but is pulled up as the disk travels.

Figure 3:
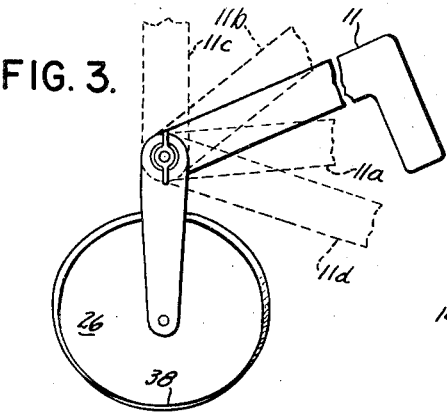
Fig. 3 is a fragmental side elevation on a small scale showing several positions of the handle in dotted lines.

The handle may be adjusted or permanently fixed in any desired position for convenient operation. The handle position shown by the solid lines of Fig. 3 is convenient for pulling and pushing with the contact point 38 lowest for close cutting. The handle position of the dotted lines 11a, during pushing, places the contact point 38 slightly to the rear of the lowest point for semi-close cutting. The handle position 11b, during pulling, places the point 38 slightly to the rear for semi-close cutting. The handle position 11d during pushing, or the handle position 11c, during pulling, disposes the contact point 38 about 45 degrees to the rear for pulling up weeds or grass without cutting.

The removable gauge ring 40 (Fig. 2) may be removably secured by screws 41 around the peripheral margin of the outer face of the outer disk 25 to project radially outwardly equal distances from the axis of the main disk for holding the disk a distance from the ground while the ring travels, frictionally engages the ground and rotates the disk 25, thus causing the above described cutting to take place further from the ground and leave the grass longer.

Figures 4, 5:
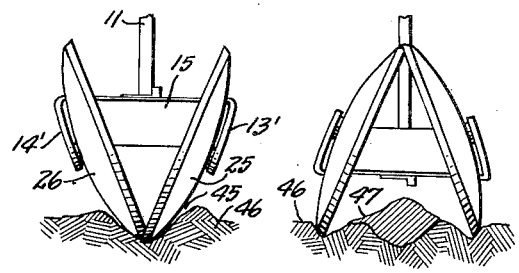
Figs. 4 and 5 are fragmental front elevational views showing different positions of the device of Fig. 6, the ground being shown in section.
Figure 6:
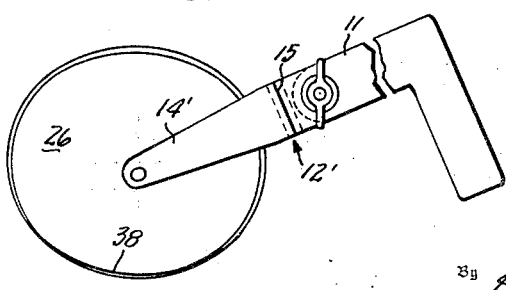
Fig. 6 is a fragmental side elevation showing another form of the invention.

In the form of the invention of Figs. 4 to 6, the fork arms 13, 14 are of substantially equal lengths and are shown inclined at a small angle to the ground. The disks 25, 26 are rotatably mounted on the ends of the arms of the fork 12' at an angle to each other and at substantially equal angles to the vertical and have a point of contact 38 at their lower parts at which part the disks are adapted to serve as the point of a plow for plowing a furrow 45 in prepared ground 46, as in Fig. 4, as for the reception of seeds. The disks may have flanges as in Figs. 1 and 2. The fork 12' and handle are normally alined and disposed at an angle of about 25 degrees to the ground for convenience in pulling or pushing for plowing as in Fig. 4, adapting the handle and fork at said angle to be reversed to place said point 38 of contact uppermost, whereby the most diverged parts of the disk may engage the ground on opposite sides of the furrow to cover the furrow and seeds with dirt as at 47.

The adjustable joint connecting the handle and fork may be omitted in any of the species shown. The device of Figs. 1 to 3 may also be used for plowing and covering; and the fork of Fig. 6 may be tilted to move the point of contact rearward, as described of the device of Figs. 1 to 3, for cutting close or less close or for pulling the weeds or grass, with or without the ring 40.

I claim as my invention:

1. A lawn edge trimming and weed pulling device comprising a fork having arms and having a handle for pulling or pushing; a pair of disks rotatably mounted on the arms of the fork at an acute angle to each other, each disk having an outer face; said disks having peripheral flanges overlapping flat against each other at a point of contact and having cutting edges; whereby forces tending to separate the disks at said point, urge said edge of the inner flange against the face of the outer flange; whereby pulling or pushing the device with said point lowermost causes said edges and faces substantially at said point to meet grass or weed substantially perpendicularly close to the ground to cut grass close to the ground; and a removable gauge ring removably secured around the peripheral margin of the outer face of the disk carrying the outer flange and projecting outwardly equal distances from the axis of the such disk for holding the disk a distance from the ground while the ring frictionally engages the ground, thus causing the cutting to take place further from the ground to leave the grass longer.

2. A lawn edge trimming and weed pulling device comprising a support having a handle for pulling or pushing; a pair of disks rotatably mounted on the support at an acute angle to each other, and having outer faces and sharp peripheral edges overlapping at a point of contact and having cutting edges pointing in opposite directions at said point; whereby pulling and pushing the device with said point lowermost causes said edges to meet substantially at said point and cut grass or weeds; a gauge ring removably secured around the peripheral margin of the outer face of one of the disks and projecting outwardly equal distances from the axis of such disk for holding the disk a distance from the ground while the ring frictionally engages and rolls on the ground.

ERNEST SCHLUETER.

References Cited in the file of this patent

UNITED STATES PATENTS

| Number | Name | Date |
|---|---|---|
| 646,506 | Sester | Apr. 3, 1900 |
| 778,830 | Martin | Dec. 27, 1904 |
| 804,889 | Shaw | Nov. 21, 1905 |
| 1,099,540 | Douglas | June 9, 1914 |
| 1,127,764 | Huck | Feb. 9, 1915 |
| 1,170,740 | Dickinson | Feb. 8, 1916 |
| 1,462,948 | Thomas | July 24, 1923 |
| 1,758,132 | Stockton | May 13, 1930 |
| 1,916,725 | Harbour et al. | July 4, 1933 |
| 2,212,057 | Waller | Aug. 20, 1940 |
| 2,555,793 | Frye | June 5, 1951 |